United States Patent [19]

Tashiro et al.

[11] Patent Number: 4,707,788
[45] Date of Patent: Nov. 17, 1987

[54] AUTOMATIC ADJUSTER FOR AUTOMOBILE DRIVER EQUIPMENT

[75] Inventors: Syuzaburo Tashiro, Okazaki; Toshikazu Ina, Nagoya; Masahiro Taguchi, Aichi; Sadahisa Onimaru, Nishio; Osamu Nakano, Aichi; Akira Kuno, Obu, all of Japan

[73] Assignees: Nippon Soken, Inc, Nishio; Nippondenso Co., Ltd., Kariya, both of Japan

[21] Appl. No.: 753,553

[22] Filed: Jul. 10, 1985

[30] Foreign Application Priority Data

Jul. 10, 1984 [JP] Japan .................................. 59-143739

[51] Int. Cl.⁴ .......................... B60N 1/02; G06F 15/20
[52] U.S. Cl. .................................... 364/424; 318/466; 296/65 R
[58] Field of Search ................ 364/424, 425; 318/466, 318/467; 296/65 R; 297/346

[56] References Cited

U.S. PATENT DOCUMENTS

| | | | |
|---|---|---|---|
| 4,204,255 | 5/1980 | Cremer | 364/425 |
| 4,339,698 | 7/1982 | Kearns | 318/466 |
| 4,404,632 | 9/1983 | Harada et al. | 364/425 |
| 4,451,887 | 5/1984 | Harada et al. | 364/425 |
| 4,463,426 | 7/1984 | Caddick et al. | 364/424 |
| 4,477,874 | 10/1984 | Ikuta et al. | 364/424 |
| 4,503,504 | 3/1985 | Suzumura et al. | 364/425 |
| 4,578,591 | 3/1986 | Floyd et al. | 364/424 |

Primary Examiner—Gary Chin
Attorney, Agent, or Firm—Cushman, Darby & Cushman

[57] ABSTRACT

An automatic adjuster for automobile driver equipment, such as a seat and mirrors, which sets the equipment at target positions for specific drivers in accordance with preset data. The automatic adjuster includes a plurality of keys having a different number of holes therein representing information indicative of individual drivers and carried by drivers for automobile access, a key sensor mounted in a key cylinder of the automobile for reading information on the keys when used for access to the automobile; a door sensor mounted in a door of the automobile for sensing the opening and closing of the door of the automobile; a computer connected with the key sensor and the door sensor for providing control outputs in response to outputs of the key sensor and the door sensor, the control outputs being responsive to the output of the door sensor indicative of the opening and closing of the door, and to the output of the key sensor indicative of the information read by the door sensor, and an actuator connected with the computer for adjusting the driver equipment based on the control outputs from the computer in such a manner that a moving speed of the driver equipment is switched in accordance with the state of use of the driver equipment.

10 Claims, 9 Drawing Figures

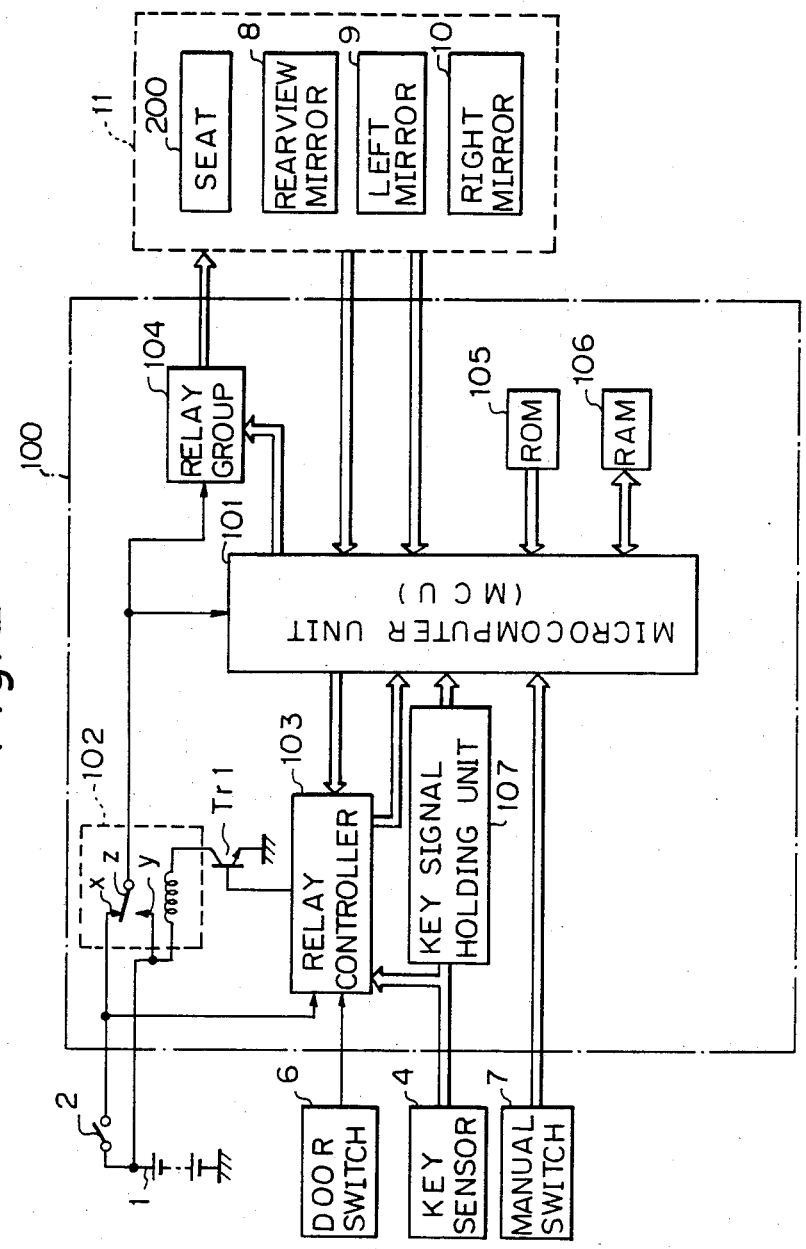

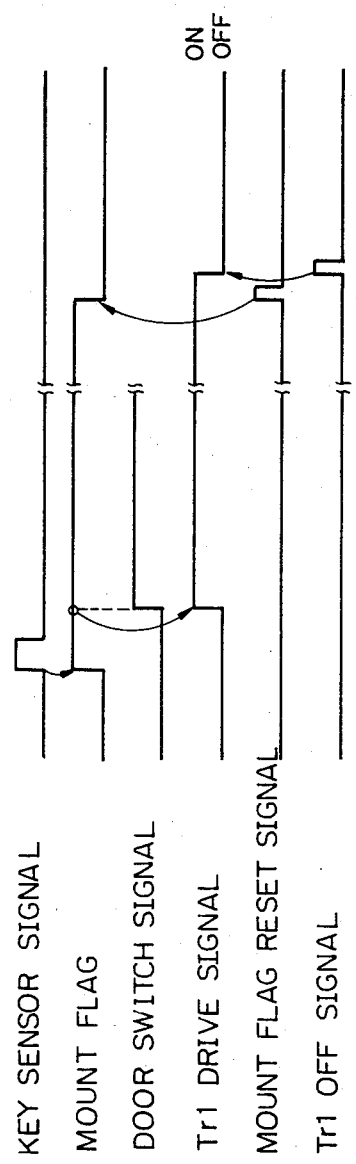

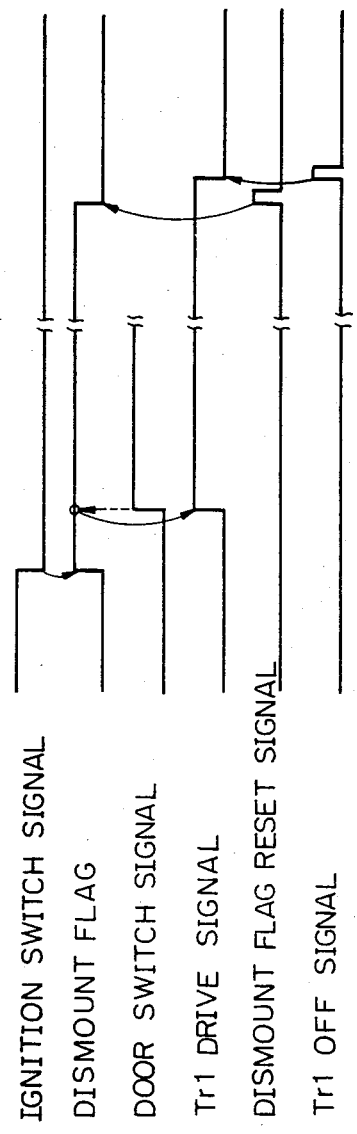

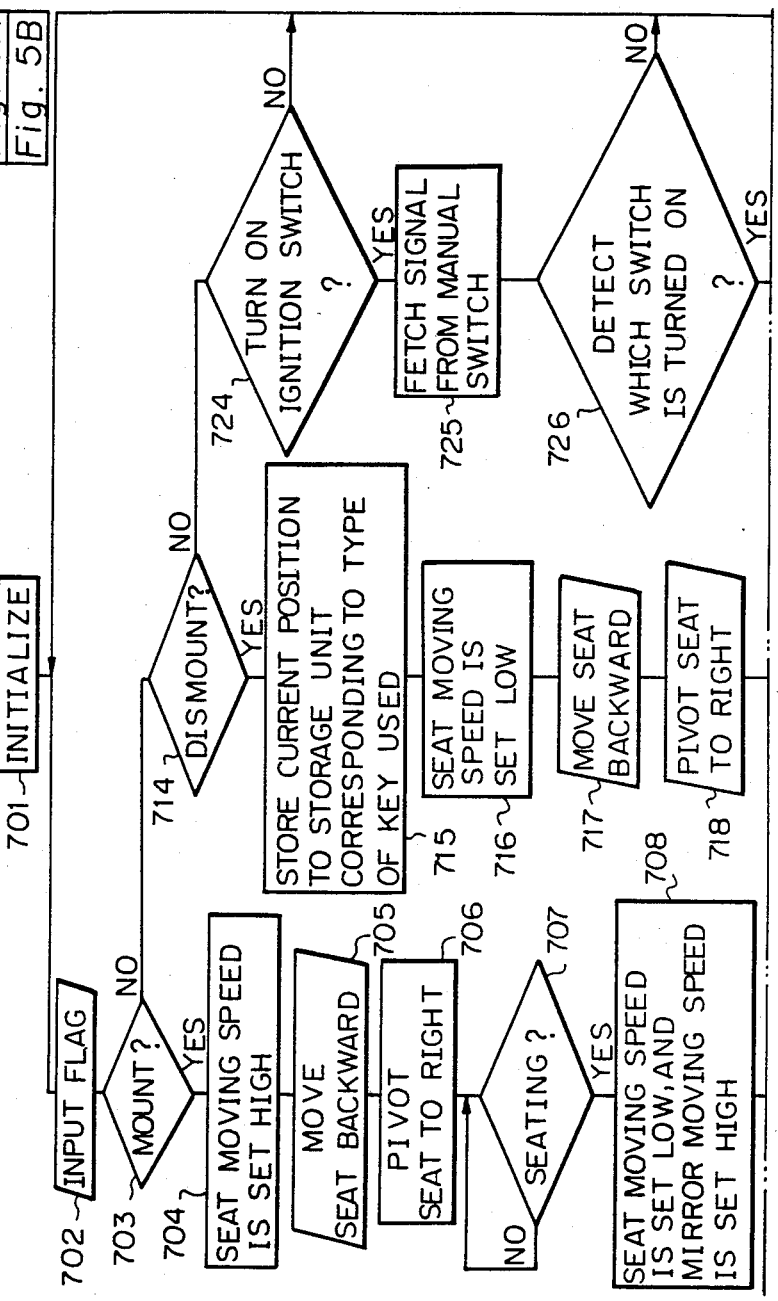

AUTOMATIC ADJUSTER FOR AUTOMOBILE DRIVER EQUIPMENT

BACKGROUND OF THE INVENTION

1. Field of the Invention

The present invention relates to an automatic adjuster for automobile driver equipment, i.e., an adjuster which can automatically set the seat, mirrors, and other equipment at optimum positions for individual drivers based on data stored in a computer.

2. Description of the Related Art

In conventional automobiles, each driver must readjust the position of his seat, mirror angles, and other equipment of the car has been previously used by someone else. Even with motorized adjustment means, this is a troublesome, time-consuming process.

Recently, proposals have been made for socalled "automatic adjusters" wherein the driver need only set his seat position and mirror angles once, the settings then being stored in a magnetic card or other storage means provided in the automobile. When the driver next uses the automobile, the settings are read out so as to reset the equipment, if necessary.

Previously proposed automatic adjusters have been designed to operate at a single speed. This speed must be set low in view of driver comfort and convenience when seated. In other words, the seat must not be moved too fast and, in the case of driver readjustment of mirrors, etc., the mirrors, etc. must not be driven too fast.

Recent automobiles are also designed so that the drivers seat will move back and pivot to enable easy driver mounting and dismounting. This retraction and pivoting operation, however, is performed at the same low speed even when the driver is not seated. Also, the automatic readjustment of mirrors, etc. is performed at the same low speed as with manual readjustment.

SUMMARY OF THE INVENTION

The primary object of the present invention is to provide an automatic adjuster for automobile driver equipment incorporating a computer.

Another object of the present invention is to provide an automatic adjuster for automatic driver equipment incorporating a computer, which computer controls the speed of operation for maximum efficiency.

In accordance with the present invention, there is provided an automatic adjuster for automobile driver equipment, such as a seat and mirrors, including detachable information means having information indicative of a driver and carried by the drivers for access to the automobiles, reading means mounted in the automobile for reading information on the information means when used for access to the automobile; control means connected with the reading means for providing control outputs in response to outputs of the reading means, the control outputs being responsive to the output of the reading means indicative of the information read by the reading means, and driving means connected with the control means for adjusting the driver equipment based on the control outputs from the control means in such a manner that a moving speed of the driver equipment is switched in accordance with the state of use of the driver equipment.

BRIEF DESCRIPTION OF THE DRAWINGS

In the drawings:

FIG. 2 is a block diagram of an electric circuit portion of the system shown in FIG. 1;

FIGS. 3 and 4 are timing charts of a relay controller and a relay shown in FIG. 2;

FIGS. 5A and 5B are flowcharts of, a control program of a microcomputer shown in FIG. 2;

DESCRIPTION OF THE PREFERRED EMBODIMENTS

Basically, according to the invention, the seat moving speed is set high before the driver mounts or after he dismounts. The mirrors, e.g., the fender sideview mirrors, door sideview mirrors and rearview mirror are driven at a high speed during automatic adjustment, and at a low speed during driver adjustment.

Figure 1:
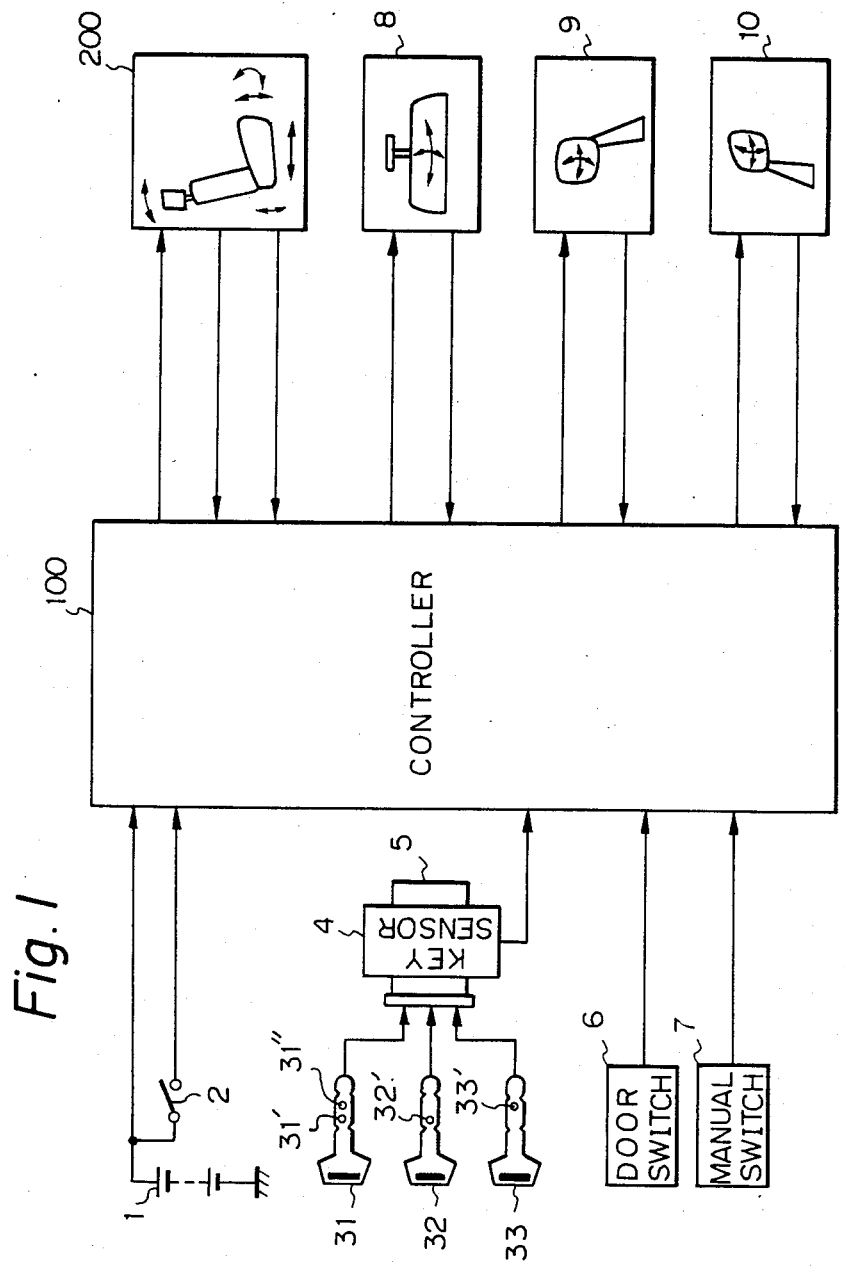
FIG. 1 is a block diagram of an overall system including an automatic adjuster for automobile driver equipment according to an embodiment of the present invention.

FIG. 1 is a block diagram of an overall system including an automatic adjuster for automobile driver equipment according to an embodiment of the present invention.

In FIG. 1, a controller 100 used as a control means is supplied with voltage directly from a battery (B) and through an ignition switch 2(IGB). The controller 100 stores position data such as the seat position and mirror angles and automatically moves the seat and mirrors when a driver mounts the automobile. The controller 100 discriminates between individual drivers by keys.

Reference numerals 31, 32, and 33 denote these keys. The keys 31 to 33 have a hole or holes 31' to 33' the number and positions of holes being different with each driver. The keys serve as information means and are carried by the drivers for access to the automobile. Holes are also formed in a key cylinder 5, the central axes of the holes of the key cylinder 5 and the hole/holes of the keys aligning when the keys are inserted in the key cylinder 5 and turned in the lock release direction. A key sensor 4 is used as a reading means. Two pairs of light-emitting diodes and phototransistors corresponding to the holes of the keys are provided on the optical axes of the holes the key cylinder 5. Reference numeral 6 denotes a door switch used as another sensing means, and having contacts which are closed when the door is open.

Reference numeral 200 denotes a seat which is moved by motors (not shown) in four modes, i.e., a back and forth mode, a vertical mode of a front edge thereof, a vertical mode of a rear edge thereof, and a back and forth reclining mode. Reference numeral 8 denotes a rearview mirror; 9, a left sideview mirror; and 10, a right sideview mirror, whose mirror surfaces are moved by motors in two modes, i.e., a left-right mode and a vertical mode. Reference numeral 7 denotes a driver manual operation switch group for manually setting the seat and the mirrors at their optimum positions.

Referring to FIG. 2, an actuator 11 used as a driving means for the seat and the mirrors has potentiometers or limit switches responsive to positions of movable portions moved by motors. The internal arrangement of the controller 100 is also shown. Reference numeral 101 denotes a microcomputer unit (MCU), which is operated in accordance with a program stored in a read-only memory (ROM) and a random-access memory (RAM), the MCU provides control outputs for controlling the actuator 11.

A relay controller 103 controls a power relay 102 through a transistor Tr1 in response to signals from the door switch 6, the key sensor 4, and the IGB power source.

Relay control when the driver mounts the automobile will be described with reference to the timing chart of FIG. 3. When a key is inserted in the door key cylinder and is turned in the lock release direction, the key sensor 4 detects the holes of the key and generates a key sensor signal. A first flip-flop (mount flag) in the relay controller 103 is set in synchronism with the rising of the key sensor signal. When the driver opens the door, the door switch 6 is turned on, and a drive signal of the transistor Tr1 is set in accordance with the AND condition between rising of the door switch signal and the mount flag. Then, the transistor Tr1 is turned on, the relay 102 is turned on, and a switching contact Z is brought into contact with a terminal Y. Thus, the MCU 101 is powered and is operated in accordance with the flow chart shown in FIGS. 5A and 5B. Note that the MCU executes steps 700 and 701 only while the power is ON.

In step 702, the MCU 101 fetches the flag in the relay controller 103 and checks in step 703 if the driver has mounted the automobile. The MCU 101 controls the operation of the mount mode corresponding to step 704 and thereafter. After the seat is automatically moved to the predetermined position, the mount flag in the relay controller 103 is reset in step 706, thus resetting the drive signal of the transistor Tr1. These steps will be explained in detail hereinafter. The transistor Tr1 is turned off, the relay 102 is turned off, and the switching contact Z is brought into contact with a terminal X. In this case, if the ignition switch 2 is turned on, the MCU 101 continues its operation, but if the switch 2 is turned off, the operation of the MCU 101 is stopped.

Relay control when the driver dismounts from the automobile will be described with reference to the timing chart of FIG. 4. When the driver dismounts from the automobile and turns off the ignition switch 2, the ignition switch signal falls. In response to the falling of the ignition switch signal, a second flip-flop (dismount flag) in the relay controller 103 is set. When the driver opens the door, the door switch 6 is turned on, and the drive signal of the transistor Tr1 is set in accordance with the AND condition between the rising of the door switch signal and the dismount flag. The transistor Tr1 is turned on, the relay 102 is turned on, and the switching contact Z is brought into contact with the terminal Y. Thus, the MCU 101 is powered and is operated in accordance with the flow chart shown in FIGS. 5A and 5B.

The MCU 101 fetches the flag in the relay controller 103 in step 702 and checks in step 714 if the driver dismounts from the automobile. The MCU 101 controls the operation in the dismount mode corresponding to step 715 and thereafter. The seat 200 is turned to the left so as to be reset at an original position, and, thereafter, the dismount flag in the relay controller 103 is reset in step 722, thus resetting the ON signal of the transistor Tr1. Thus, the transistor Tr1 is turned off, the relay 102 is turned off, and the switching contact Z is brought into contact with the terminal X. In this case, since the ignition switch 2 is turned off, the operation of the MCU 101 is stopped.

Figure 6:
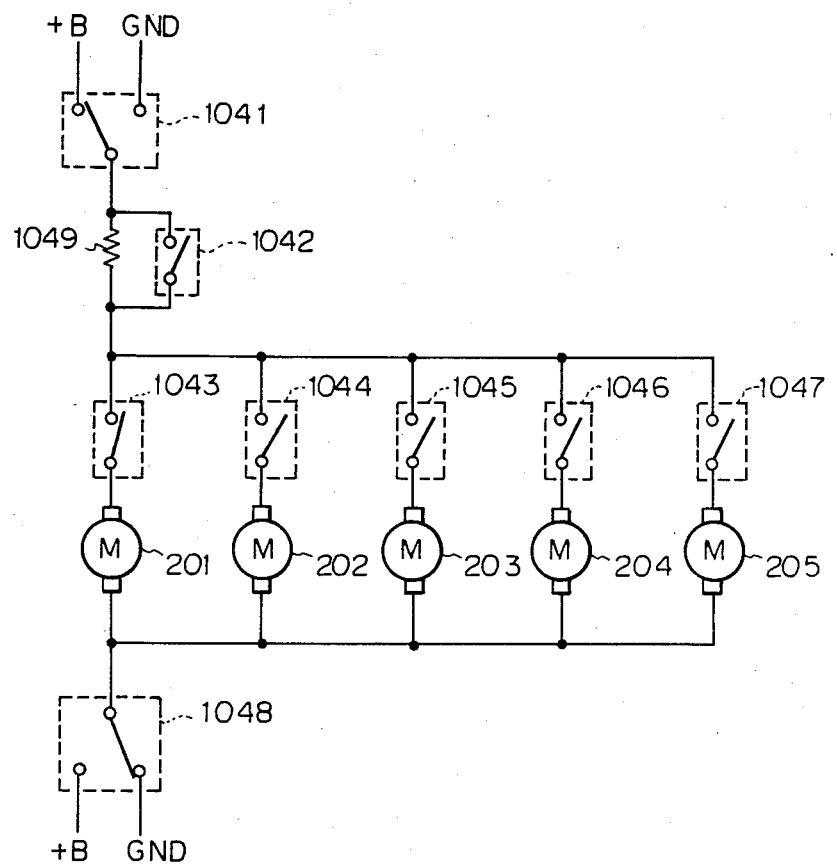
FIG. 6 is a detailed circuit diagram of a relay group shown in FIG. 2.

FIG. 6 is a circuit diagram of a motor switching and speed switching relay group 104, in which five motors corresponding to five moving modes of the seat 200 are shown. The mirrors can be arranged in the same manner as for the seat 200. Five relays 1043 to 1047 are provided for selectively switching the motor to be operated. Relays 1041 and 1048 switch a rotating direction of the motor. A relay 1042 switches the speed. When the relay 1042 is open, since a current supplied to the motors is limited by a resistor 1049, the motors are rotated at low speed, and the moving speed of the seat also becomes low. On the other hand, when the relay 1042 is closed, since the motors are rotated at high speed, the moving speed of the seat becomes high.

The overall operation of the above-mentioned components will be described with reference to the flow chart shown in FIGS. 5A and 5B.

Figure 5B:
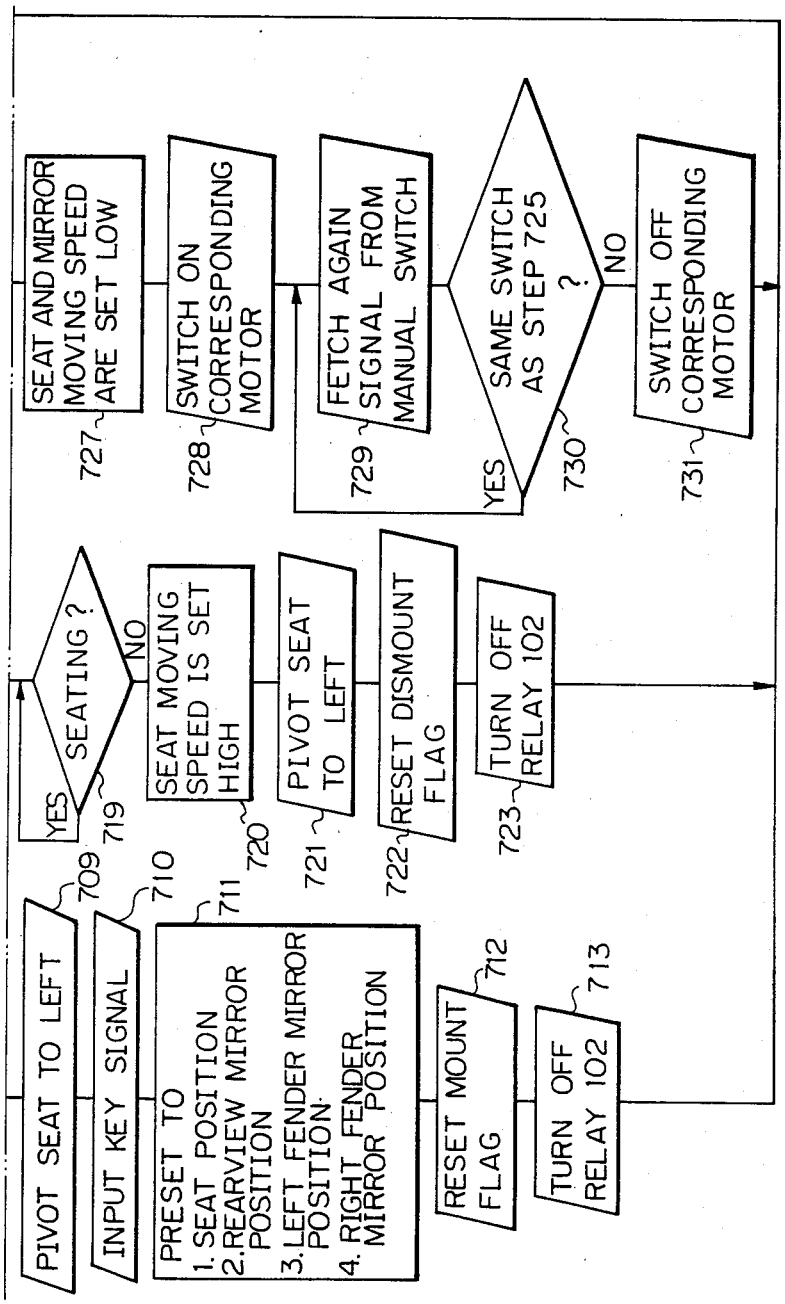

In FIGS. 5A and 5B, when the MCU 101 is powered, initialization is performed in step 701. The MCU 101 is powered in the following three cases: First, when the driver proceeds to mount the automobile by releasing the door lock and opening the door, whereupon the relay 102 is turned on; second, when the driver dismounts from the automobile by turning off the ignition switch and opening the door, whereupon the relay 102 is turned on; and, third, when the ignition switch 2 is kept on. The MCU 101 fetches the flag in step 702 so as to discriminate which element causes the MCU 101 to be powered, that is, which element should be controlled thereby. If it is determined in step 703 that the mount flag is set, control for the mount mode is performed.

Figure 7:
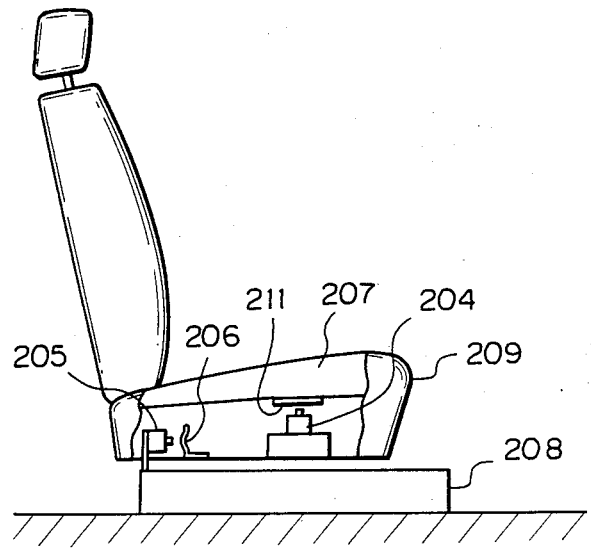
FIGS. 7 and 8 are illustrations of an arrangement of limit switches provided for a seat shown in FIG. 1.

To allow the driver to easily mount the automobile, the seat is moved to a rearmost position and thereafter turned to face the driver. In this case, the seat moving speed is set to be high in step 704. More specifically, as described above, the relay 1042 shown in FIG. 6 can simply be closed. When the relay group 104 is controlled such that a seat motor is rendered operative to move the seat backward in step 705, the motor is rotated at a high speed, and the seat is moved backward at a high speed. Referring to FIG. 7, a limit switch 205 for detecting a seat rear end portion is provided on a base 208 fixed to the body of the automobile. In step 705, a state of the limit switch 205 is monitored. When it is detected that an actuating plate 206 depresses the switch 205 so as to turn it on, the relay group 104 is controlled to make the slide motor inoperative.

Figure 8:
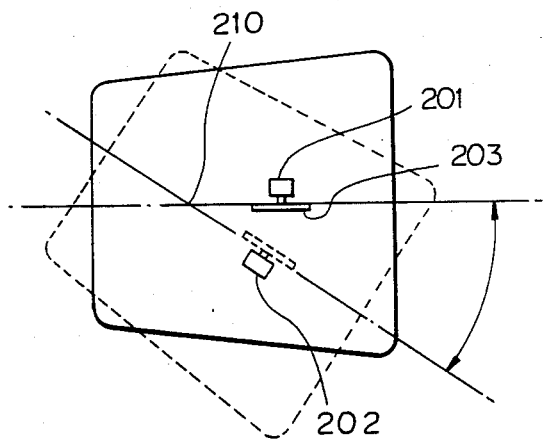

In step 706, the relay group 104 is controlled so that a seat-pivoting motor is made operative to pivot the seat to the door side (right side for European and Japanese automobile). The motor is rotated at high speed and the seat is thus pivoted to the door side at high speed. Referring to FIG. 8, a limit switch 202 is provided for detecting the limit of the pivotal movement of the seat. In step 706, a state of the limit switch 202 is monitored. Thus, when it is detected that an actuating plate 203 depresses the switch 202 so as to turn on it, the relay group 104 is controlled to disable the seat-pivoting motor.

Referring to FIG. 7, a seat-occupied switch 204 is provided for detecting that the driver is seated. In step 707, a state of the switch 204 is monitored. When it is detected that an actuating plate 211 depresses the switch 204 so as to turn it on, the flow advances to step 708. In step 708, since the driver is seated, the seat moving speed is set to be low, and since the mirrors are automatically set, the moving speed thereof is set to be high. In step 709, the relay group 104 is controlled, so that the seat-pivoting motor is made operative to pivot the seat toward the front. The motor is rotated at low speed, and the seat is pivoted to the from at low speed.

Referring to FIG. 8, a limit switch 201 is provided for detecting that the seat faces forward. In step 709, a state of the limit switch 201 is monitored. When it is detected that the actuating plate 203 depresses the switch 201 so as to turn it on, the relay group 104 is controlled to disable the seat-pivoting motor. The above-mentioned control is performed so as to allow the driver to easily mount the automobile.

In the next step and thereafter, control for automatically setting the seat and mirrors at their preset positions is performed. Referring to FIG. 2, reference numeral 107 denotes a key signal holding unit for setting/holding a key sensor signal from the key sensor 4 when the door is unlocked. The key sensor signal is held by the unit 107 until the door lock is released by use of a different key. In step 710, the key sensor signal held by the holding unit 107 is fetched. In step 711, the preset positions to which the respective actuating plates are moved are read out from the storage units corresponding to the type of key, and are compared with the current positions of the respective actuating plates. Thus, the biasing direction of each motor is determined, and the relay group 104 is controlled in accordance therewith. When the preset position is the same as the current position, the relay group 104 is controlled to stop operation of the corresponding motor. In this case, the moving speed of the seat is set to be low and that of the mirrors is set to be high. When automatic movement to the preset positions is completed for all the motors, the mount flag is reset in the relay controller 103 in step 712, and the relay 102 is turned off in step 713. When the relay 102 is turned off, the MCU 101 is disabled and stops operating. In the mount mode, the above-mentioned control is performed.

Control for the dismount mode will be described below. When it is determined in step 714 that the dismount flag is set, control for the dismount mode is performed in the following steps.

In step 715, the current positions of th respective actuating plates are stored in the storage unit corresponding to the type of key used. Then, control for allowing the driver to easily dismount the automobile is performed. This control is substantially the same as that for allowing the driver to easily mount the automobile. In step 716, since the driver is seated, the seat speed is switched to be low. In step 717, the seat is moved backward until the limit switch 205 at the rearmost position is turned on. In step 718, the seat is pivoted to the door side the limit switch 202 is turned on. In step 719, the state of the switch 204 is monitored, and when it is detected that the switch 204 is turned off, the flow advances to step 720. In step 720, the seat moving speed is switched to be high. In step 721, the seat is pivoted to the front until the limit switch 201 is turned on. When the seat is set at the original position (or faces forward), the mount flag in the relay controller 103 is reset in step 722, and the relay 102 is turned off in step 723. When the relay 102 is turned off the MCU 101 is disabled, thus stopping the operation of the MCU 101. The above-mentioned control performed in the dismount mode.

The operation for manually adjusting the seat and/or mirrors at optimum positions for the driver using the manual operation switch will be described hereinafter.

Manual operation is enabled only when the ignition switch 2 is kept on. If it is detected in step 724 that the switch 2 is turned on, signals from the manual operation switch group 7 are fetched in step 725. If it is detected in step 726 that a switch in the switch group 7 is turned on, the motor corresponding to the switch pressed and its biasing direction are determined in step 726. Then, in order to make the setting operation easier, the seat moving speed and the mirror moving speed are set to be low in step 727. Thereafter, in step 728, the relay group 104 is controlled so as to render the corresponding motor operative. In step 729, the signals from the switch group 7 are fetched again. In step 730, it is checked if the signals fetched in step 725 are the same as those fetched in step 729. As long as the same switch is being operated, steps 729 and 730 are repeated. Therefore, the corresponding motor is continuously rotated. When the switch is turned off, the flow advances to step 731 to control the relay group 104 so as to turn off the corresponding motor. Then, the flow returns to step 702, and the MCU 101 is in the stand-by state until the next manual switch is operated. If no switch in the switch group 7 is operated, the MCU 101 awaits switch input upon repeating steps 702, 703, 714, 725, 726 and 702.

Note that in the above arrangement, the rotating speed of the driving motors can be switched by changing a brush opposing angle as in a wiper motor for an automobile.

In the above embodiment, the seat moving speed is switched to be high excluding the case when the driver is seated and the seat position is manually set. However, the present invention is not limited to this arrangement. For example, the seat moving speed can be set to be high excluding the case when manual setting operation is performed. In this case, in order to eliminate discomfort to the driver due to abrupt change in speed at the beginning and end of movement, the seat is temporarily moved at low speed at the beginning of its movement and thereafter is moved at high speed. When the seat is being stopped, the moving speed of the seat is temporarily decreased to be low, and the seat is then stopped. Therefore, discomfort to the driver can be eliminated.

What is claimed is:

1. An automatic adjuster for automobile driver equipment adjusted in accordance with a figure and dimensions of an individual driver, such as a seat and mirrors, comprising:

detachable information means having information indicative of said individual driver and carried by said driver for access to the automobile;

reading means mounted in said automobile for reading information on said information means when used for access to said automobile;

manual adjustment means for manually adjusting said driver equipment;

control means connected with said reading means and said manual adjustment means for providing control outputs in response to outputs of said reading means and said manual adjustment means, said control outputs being responsive to said outputs of said reading means indicative of the information read by said reading means, and responsive to said manual adjustment means to determine whether said driver equipment is being manually adjusted, driving means connected with said control means for adjusting said driver equipment based on said control outputs from said control means to cause a moving speed of said driver equipment to be a first slow speed when said driver equipment is manually adjusted, and a second fast speed at least when said driver equipment is not being manually adjusted.

2. An automatic adjuster as claimed in claim 1, wherein said information means comprises a plurality of keys having a different number of holes in each key.

3. An automatic adjuster as claimed in claim 1, wherein said reading means comprises a key sensor.

4. An automatic adjuster as claimed in claim 1, further comprising sensing means mounted in said automobile and coupled to said control means, for sensing an opening and closing of a door of said automobile.

5. An automatic adjuster as claimed in claim 1, wherein said driving means comprises actuator means.

6. An automatic adjuster as claimed in claim 1, wherein said control means causes a moving speed of said driver equipment to be high during an automatic adjustment of said driver equipment, and to be low during manual adjustment of said driver equipment by said driver.

7. An automatic adjuster as claimed in claim 1, wherein said control means causes a moving speed of said seat is set to be low when said driver is detected as being seated.

8. An automatic adjuster as claimed in claim 1, wherein said control means comprises a microcomputer.

9. An automatic adjuster as claimed in claim 5, wherein said actuator means comprises pluralities of potentiometers and limit switches and motors.

10. In an automatic adjuster for automobile driver equipment adjusted in accordance with a figure and dimensions of a driver, such as a seat and mirrors, said automatic adjuster having information means carried by a driver and provided thereon with information indicative of said driver, reading means mounted in said automobile for reading the information on said information means when used for access to said automobile, control means responsive to said reading means for producing an output indicative of a target position of said driver equipment in correspondence with an output of said reading means, and driving means for adjusting said driver equipment to said target position in response to said output of said control means, the improvement which comprises:

detecting means, coupled to said control means, for detecting when said driver equipment is manually adjusted;

sensing means mounted in said automobile for sensing an opening of a door of said automobile;

said control means being connected to said sensing means and producing another output in response to an output of said sensing means indicative of the opening of said door, said control means being coupled to said detecting means and producing a further output when said driver equipment is selected as being manually adjusted; and said driving means adjusting said driver equipment to said target position in response to said another output and said further output of said control means to cause a moving speed of said driver equipment to be (1) low when said door is sensed as not open and when driver equipment is detected as being manually adjusted and (2) high at least when said driver equipment is detected as being not manually adjusted.

* * * * *